United States Patent [19]

Schäfer et al.

[11] Patent Number: 4,707,386
[45] Date of Patent: Nov. 17, 1987

[54] PROCESS FOR THE PRODUCTION OF SHEET STRUCTURES

[75] Inventors: Walter Schäfer, Cologne; Hanns P. Müller, Odenthal; Rolf Küchenmeister; Armin Sickert, both of Krefeld, all of Fed. Rep. of Germany

[73] Assignee: Bayer Aktiengesellschaft, Leverkusen Bayerwerk, Fed. Rep. of Germany

[21] Appl. No.: 944,782

[22] Filed: Dec. 22, 1986

[30] Foreign Application Priority Data

Jan. 11, 1986 [DE] Fed. Rep. of Germany ....... 3600595

[51] Int. Cl.$^4$ .............................................. B05D 3/02
[52] U.S. Cl. .................................. 427/386; 427/385.5; 427/389.7; 427/389; 525/454
[58] Field of Search ................. 427/386, 385.5, 389.7; 524/454

[56] References Cited

U.S. PATENT DOCUMENTS

| | | | |
|---|---|---|---|
| 3,388,087 | 6/1968 | Dieterich | 260/29.2 |
| 3,461,103 | 8/1969 | Keberie et al. | 260/75 |
| 3,479,310 | 11/1969 | Dieterich et al. | 260/29.2 |
| 3,480,592 | 11/1969 | Dieterich et al. | 260/77.5 |
| 3,686,108 | 8/1972 | Reiff | 260/29.2 |
| 3,756,992 | 9/1973 | Dieterich | 260/77.5 |
| 3,905,929 | 9/1975 | Noll | 260/29.2 |
| 4,163,815 | 7/1979 | Cheung | 427/386 |
| 4,379,728 | 4/1983 | Lin | 156/307.3 |
| 4,401,499 | 8/1983 | Kaneko et al. | 427/386 |
| 4,522,851 | 6/1985 | Rosthauser | 427/386 |
| 4,619,966 | 10/1986 | Schäfer et al. | 427/389.7 |

FOREIGN PATENT DOCUMENTS 912090 5/1954 Fed. Rep. of Germany .
3441934 5/1986 Fed. Rep. of Germany .
1148244 4/1969 United Kingdom .

OTHER PUBLICATIONS

D. Dieterich et al., "Angewandte Chemie," vol. 82, 1970, pp. 53–63 et seq.

Primary Examiner—Thurman K. Page
Assistant Examiner—L. R. Horne
Attorney, Agent, or Firm—Gene Harsh; Joseph C. Gil; Thomas W. Roy

[57] ABSTRACT

The present invention relates to a process for the production of water- and solvent-resistant coatings by coating substrates with an aqueous coating composition containing as binder a mixture of (1) reaction products, containing anionic structural units of the formula

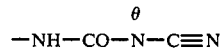

in a quantity of 5 to 1200 milliequivalents per 100 g of said reaction products, obtained by reacting organic polyisocyanates with salts of cyanamide and bases selected from ammonia, volatile primary and secondary amines having a pKb-value of at least 3.1 and any volatile aliphatic tertiary amines and (2) polyepoxides having at least two epoxide groups per molecule and an epoxide equivalent of at least about 80, said polyepoxides being used in a quantity corresponding to an equivalent ratio of epoxide groups to anionic structural units of about 0.1:1 to 3:1, and cross-linking the binder at a temperature of about 5 to 200° C. The present invention is also directed to the aqueous-coating composition based on components 1 and 2.

2 Claims, No Drawings

PROCESS FOR THE PRODUCTION OF SHEET STRUCTURES

FIELD OF THE INVENTION

The present invention relates to new aqueous coating compositions and to their use for the production of water- and solvent-resistant coatings by coating a substrate with an aqueous coating composition containing, as binder, anionically modified polyisocyanate addition products and compounds containing epoxide groups.

DESCRIPTION OF THE PRIOR ART

Aqueous solutions and dispersions of anionically modified polyisocyanate addition products, in particular aqueous dispersions of anionically modified polyurethanes and polyurethane polyureas, and their use for the production of coatings are known (see e.g. DE-PS No. 1,184,946, DE-PS No. 1,178,586, DE-AS No. 1,237,306, DE-OS No. 1,495,745, DE-OS No. 1,595,602, DE-OS No. 1,770,068, DE-OS No. 2,019,324, DE-OS No. 2,314,512 and D. Dieterich et al, Angew. Chem. 82, 53 (1970)).

The dispersibility of the polyisocyanate polyaddition products in these dispersions is due to the presence of built-in (chemically incorporated) ionic centers, in particular built-in sulphonate or carboxylate groups. When coatings are produced from these dispersions, the ionic centers generally remain in the resulting coatings with the result that the water resistance of the coatings obtained is reduced.

It is therefore an object of the present invention to provide a new process for the production of coatings using aqueous solutions or dispersions of anionically modified polyisocyanate addition products which have improved water resistance.

The object was achieved by the process according to the invention described below.

SUMMARY OF THE INVENTION

The present invention relates to a process for the production of water- and solvent-resistant coatings by coating substrates with an aqueous coating composition containing as binder a mixture of (1) reaction products, containing anionic structural units of the formula

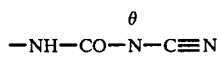

in a quantity of 5 to 1200 milliequivalents per 100 g of said reaction products, obtained by reacting organic polyisocyanates with salts of cyanamide and bases selected from ammonia, volatile primary and secondary amines having a pKb-value of at least 3.1 and any volatile aliphatic tertiary amines and (2) polyepoxides having at least two epoxide groups per molecule and an epoxide equivalent of at least about 80, said polyepoxides being used in a quantity corresponding to an equivalent ratio of epoxide groups to anionic structural units of about 0.1:1 to 3:1, and cross-linking the binder at a temperature of about 5° to 200° C.

The present invention is also directed to the aqueous coating composition based on components 1 and 2.

DETAILED DESCRIPTION OF THE INVENTION

The reaction of organic polyisocyanates inter alia with salts of cyanamide and tertiary amines, optionally in an aqueous medium is described in DE-PS No. 912,090; however, this reference is not directed to the use of volatile bases, instead stating that alkali and alkaline earth metal salts of cyanamide are preferred. U.S. Pat. No. 4,379,728 discloses the cross-linking of reaction products of cyanamide with isocyanates, preferably aromatic isocyanates, in the presence of epoxides, but does not disclose the use of salts of cyanamide to prepare the polyisocyanate polyaddition products nor the preparation of aqueous compositions.

According to German Patent Application No. P 34 41 934.9, aqueous coating compositions containing polyisocyanate addition products of the type used as binder component (1) in the process according to the invention are used for the production of water- and solvent-resistant coatings. It has now been found that the combination of the binders described in the earlier application with polyepoxides as a second binder component results in aqueous coating compounds which can be hardened at lower temperatures.

The aqueous coating compositions to be used in the process according to the invention are solutions or dispersions of binder components (1) and (2), described more fully below, in water or a mixture of water and organic solvents having a water content in the mixture of at least 10% by weight. The aqueous coating compositions may optionally contain the usual auxiliary agents and additives used in coatings technology.

The solvents and dispersing agents are either pure water or a mixture of water and solvent. Suitable solvents include not only solvents which are miscible with water such as acetone, methanol, ethanol, methyl ethyl ketone, N-methylpyrrolidone and tetrahydrofuran, but also solvents which are incompatible with water such as ethyl acetate, n-butanol and toluene. However, if such solvents which are not miscible with water are used, their quantity must be limited so that the polyisocyanate addition products are obtained as homogeneous solutions or dispersions. If larger quantities of such solvents are present (e.g. because they have previously been used for the preparation of the addition products), the excess must be removed by decanting (from the insoluble addition product) or by distillation (from the solution or dispersion).

Binder component (1) is based on reaction products of organic polyisocyanate with certain salts of cyanamide.

The following are examples of polyisocyanates suitable for the preparation of these polyisocyanate addition products:

(i) Simple organic polyisocyanates having a molecular weight of 168 to about 300, e.g. 1,6-diisocyanatohexane, 1-isocyanato-3,3,5-trimethyl-5-isocyanatomethylcyclohexane, 2,4- and/or 2,6-diisocyanatotoluene, 4,4'- and/or 2,4'-diisocyanatodiphenylmethane and 4,4'-diisocyanatodicyclohexylmethane. These simple diisocyanates are however, less preferred.

(ii) Modified lacquer polyisocyanates" having a molecular weight (average) of up to 1000, i.e. the known modified polyisocyanates containing biuret, isocyanurate, uretdione or oxadiazine-trione groups and based on the simple diisocyanates mentioned under (i). Examples include tris-(6-isocyanatohexyl)-biuret or mixtures thereof with its higher homologues, tris-(6-isocyanatohexyl)-isocyanurate or mixtures thereof with its higher homologues and optionally with bis-(6-isocyanatohexyl)-uretdione; and bis-(6-isocyanatohexyl)-oxadiazinetrione.

(iii) Relatively high molecular weight isocyanate prepolymers based on the polyisocyanates mentioned under (i) and (ii) and the polyhydroxyl compounds known from polyurethane chemistry having molecular weights of 62 to about 4000, preferably 62 to about 2500. These may be reaction products of the polyisocyanates exemplified under (i) and (ii) with subequivalent quantities of simple, polyhydric alcohols such as ethylene glycol, propylene glycol, trimethylol propane and/or glycerol; polyhydric alcohols containing ether groups such as diethylene glycol, dipropylene glycol, tripropylene glycol, tetrapropylene glycol; higher molecular weight polyether polyols such as those obtained by the alkoxylation of suitable starter molecules (e.g. the above-mentioned simple polyhydric alcohols) by means of ethylene oxide and/or propylene oxide; and polyester polyols which are obtainable in a known manner by reacting polybasic acids or their anhydrides (e.g. adipic acid, phthalic acid, tetrahydrophthalic acid, hexahydrophthalic acid or maleic acid) optionally together with minor quantities of monobasic acids (such as benzoic acid or fatty acids) with excess quantities of polyhydric alcohols, in particular the alcohols exemplified above which are free from ether groups. To prepare these isocyanate prepolymers, the exemplified polyisocyanates or any mixtures of these polyisocyanates are reacted with subequivalent quantities of the polyhydroxyl compounds exemplified above or any mixtures of such polyhydroxyl compounds at an NCO-/OH equivalent ratio of about 1.2:1 to 8:1, preferably about 1.5:1 to 3:1. As may be seen from the NCO/OH equivalent ratio, these "prepolymers" are in many cases, so-called "semiprepolymers," i.e. mixtures of excess, unreacted starting polyisocyanate with true isocyanate prepolymers containing urethane groups. Such "semiprepolymers" may also be used for the preparation of the polyisocyanate adducts to be used according to the invention.

When preparing the polyisocyanate addition products, the ionically modified starting components known from the chemistry of polyurethane dispersions may in principle be used so that the polyisocyanate addition products contain not only the anionic structural units of the general formula mentioned above which are essential to this invention, but also built-in carboxylate or sulphonate groups. This may be achieved, for example, by using isocyanate prepolymers which have been prepared with the use of polyhydric alcohols containing carboxylate or sulphonate groups or the corresponding hydroxy-carboxylic acids or hydroxysulphonic acids with subsequent neutralization of the acid groups. However, the use of such anionic starting components is less preferred for two reasons. First, the hydrophilic character of the anionic structural units which are essential for the invention is generally sufficient to ensure the solubility or dispersibility of the polyisocyanate addition products. Second, if such anionic starting components are used, the built-in anionic groups would remain in the coating and defeat the purpose of the invention.

The polyisocyanate component used for the preparation of the polyisocyanate addition products generally has an isocyanate content of about 0.2 to 50% by weight, preferably about 4 to 25% by weight.

The question as to whether simple polyisocyanates, lacquer polyisocyanates or isocyanate prepolymers should be used for the preparation of the polyisocyanate addition products depends primarily on the desired properties of the coating. For example, the elasticity of the coating may be increased by incorporating elasticizing, relatively high molecular weight polyhydroxyl compounds in the polyisocyanate component.

The polyisocyanate addition products are prepared by reacting the organic polyisocyanates with ammonium salts of cyanamide. These ammonium salts may be put into the process as such or they may be prepared in situ by simultaneously using cyanamide and suitable bases. Suitable ammonium salts of cyanamide are those based on (i) ammonia, (ii) volatile primary or secondary amines having a pKb-value of at least 3.1 such as methylamine, dimethylamine, ethylamine or tertiary butylamine or (iii) any volatile aliphatic tertiary amines such as trimethylamine, triethylamine, tripropylamine, dimethylaminoethanol, N-methyl-diethanolamine or triethanolamine. The term "volatile" in this context denotes that the amines evaporate or vaporize when the coatings are dried and cross-linked, optionally at elevated temperatures. The decomposition (splitting off of the salt-type cyanuric ammonium group) with liberation of the amine in the process of drying the coating is a precondition for satisfactory chemical hardening of the structure.

Preparation of the polyisocyanate addition products from the above-mentioned starting materials is generally carried out at temperatures of about 0° to 80° C., preferably about 5° to 50° C., in an organic or aqueous medium, preferably with preparation of the ammonium salts in situ in the given reaction mixture. The quantity of cyanamide is calculated to provide a molar ratio of free isocyanate groups to cyanamide in the range of about 0.5:1 to 1.5:1, preferably about 0.8:1 to 1.2:1. The quantity of base used is calculated to provide at least about 0.5 mol, preferably 1 mol of basic nitrogen atoms for each mol of cyanamide which is to be reacted with isocyanate groups. Although amine may be used in excess, no advantages are obtained. The reaction between the isocyanate groups of the polyisocyanate component and the ammonium salts proceeds in accordance with the following equation:

$$R(NCO)_n + nH_2N-C\equiv N + nNR'_3 \longrightarrow$$

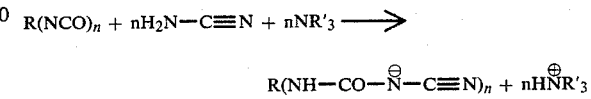

$$R(NH-CO-\overset{\ominus}{N}-C\equiv N)_n + nH\overset{\oplus}{N}R'_3$$

In the above equation, R represents the inert group of the n-functional polyisocyanate and R' represents hydrogen or the inert organic group of the base.

Binder component (1) generally contains about 5 to 1200, preferably about 25 to 500 milliequivalents of the above-mentioned anionic groups per 100 g of component (1) to ensure the solubility or dispersibility of the two binder components (1) and (2) in the continuous aqueous phase.

Binder component (2) which is an essential component of the invention is based on polyepoxides of the type known from the chemistry of epoxide resins, i.e. epoxide resins based on phenols, in particular on bisphenol A and phenol novolaks as well as epoxide resins based on aliphatic alcohols or on copolymers having glycidyl groups.

Compounds containing at least two epoxide groups and obtained by the reaction of epichlorohydrin with aromatic amines such as aniline, 2,4- and 2,6-diaminotoluene or 4,4'-diaminodiphenylmethane are also suitable. The polyepoxides should have an epoxide equivalent weight of at least about 80, preferably about 100 to 300, and contain at least 2, preferably 2 to 4, most preferably 2 epoxide groups per molecule. Reaction products of bisphenol A (2,2-bis-(4-hydroxyphenyl)-propane) with epichlorohydrin conforming to these conditions are particularly preferred. Compounds of this type have been fully described in "Handbook of Epoxy Resins" by H. Lee and K. Neville, McGraw-Hill Book Com., New York, 1967.

The polyepoxides are added to the coating compounds according to the invention in such quantities that the products contain about 0.1 to 3, preferably about 0.2 to 2 epoxide groups per anionic structural unit of the formula

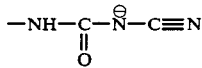

Hydrophilic modification of the polyepoxides is generally not necessary in order to ensure their solubility or dispersibility in the aqueous medium since the anionically modified polyisocyanate addition products generally have a sufficient dispersing or solubilizing action for the polyepoxides even when predominantly aqueous solvents or dispersing agents are used.

Several variations are available for the preparation of aqueous solutions or dispersions of the binders (1) and (2).

1. An organic polyisocyanate of the type exemplified above in the form of a liquid or solution using an organic solvent of the type exemplified above is reacted with a mixture of cyanamide and a base, followed by solution or dispersion of the reaction product in water, optionally after removal of solvent from the reaction product and optionally with subsequent removal of the solvent from the solution or dispersion by distillation. The polyepoxide is then added for the purpose of homogenization, optionally with heating to about 40°–80° C.

2. An organic polyisocyanate of the type exemplified under (i) or (ii) is mixed with a subequivalent quantity of a polyhydroxyl compound of the type exemplified under (iii), cyanamide and a base, optionally in the presence of an inert solvent. The isocyanate prepolymer and the ammonium salt of cyanamide and base are prepared in situ, further reacted by a one-pot process and worked up as described under 1. The polyepoxide is added for the purpose of homogenization, optionally with heating to about 40°–80° C.

3. A polyisocyanate, optionally dissolved in an inert solvent of the type exemplified above, is added to an aqueous solution of an ammonium salt of cyanamide, optionally followed by distillative removal of the auxiliary solvent. The polyepoxide is added for the purpose of homogenization, optionally with heating to about 40°–80° C.

4. A polyisocyanate, optionally dissolved in an inert solvent of the type exemplified, is added to an aqueous mixture of an ammonium salt of cyanamide and a polyepoxide, optionally with subsequent distillative removal of the auxiliary solvent. In this embodiment for the preparation of the solutions or dispersions of binder components (1) and (2), it is possible, when using a polyisocyanate excess based on the quantity of the ammonium salt of cyanamide present, that a proportion of the isocyanate groups will react with hydroxyl groups present in the polyepoxide to form urethane groups, with the result that the binder components (1) and (2) would at least partly be present not as a mixture but chemically bonded through urethane groups. The simultaneous use of binder components (1) and (2), which is an essential feature of this invention, therefore also covers binder combinations in which the individual components (1) and (2) are at least partly chemically bonded together via urethane groups.

It would also be possible in principle to combine binder component (1) at any stage after its preparation with binder component (2).

The alcohols mentioned above in the list of suitable solvents naturally cannot be used as solvents for the polyisocyanate component but only as solvents for the cyanamide and base, i.e. the ammonium salt of cyanamide. When such solutions in alcoholic solvents are reacted with the polyisocyanates, the alcoholic hydroxyl groups do not interfere with the reaction since the salts of cyanamide react much more rapidly with the isocyanates than the alcoholic hydroxyl groups of the solvent.

In all of the cases mentioned above, solutions or dispersions of the polyisocyanate addition products in combination with polyepoxides in the aqueous or aqueous-organic solvents or dispersing agents are finally obtained. The question as to whether these are solutions or dispersions depends both on the molecular weight of the polyisocyanate, the proportion of anionic groups present in binder component (1), the nature and quantity of the polyepoxide compound used and the composition of the solvent or dispersing agent. True solutions of the binder components are frequently obtained when predominantly aqueous solvents or dispersing agents are used and when the solvents or dispersing agents contain a high proportion of water-miscible organic solvents. The solids content of the solutions or dispersions, based on binder components (1) and (2) and not counting any auxiliary agents and additives is generally about 5 to 95% by weight, preferably about 20 to 80% by weight.

The resulting aqueous solutions or dispersions may be put into the process according to the invention either as such or after they have been mixed with auxiliary agents and additives.

The auxiliary agents and additives include dyes, pigments, levelling agents and other known auxiliary agents and additives used in coatings technology.

To carry out the process according to the invention, the aqueous solutions or dispersions optionally containing auxiliary agents and additives of the type mentioned above may be applied by known methods to the substrates which are to be coated. Conversion of the wet films obtained from this coating procedure into a crosslinked lacquer film takes place at a temperature of about 5 to 200° C., preferably about 25 to 180° C., while the solvent or dispersing agent is evaporated off or left to dry naturally. A heat treatment within the above-mentioned temperature ranges may be indicated, especially in order to accelerate the desired curing of the coating.

However, evaporation of the solvent or dispersing agent and simultaneous chemical cross-linking of the binder may take place not only under the conditions of such a heat treatment but also, for example, if the coating is kept at room temperature. In the course of this chemical cross-linking, polyisocyanate addition products containing cyano-urea end groups are liberated as an intermediate product and undergo dimerization to form chain lengthened or cross-linked products containing N-cyanoguanidine structural units, presumably in accordance with the following reaction scheme

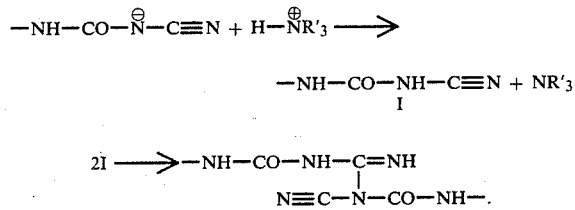

The cyano-ureas and their dimerization products also undergo cross-linking with the polyepoxide.

The degree of cross-linking of the surface structures finally obtained may be adjusted by the functionality of the polyisocyanates used for preparing binder component (1), the molecular weight of the polyisocyanates, and the functionality and quantity of the polyepoxides used and/or their molecular weight.

The process according to the invention may be used for the formation of a wide variety of coatings. Thus the term "coating" in the context of the present invention includes both lacquer coatings on substrates including metal, wood, paper, textiles, leather, mineral substrates or glass fibers, and adhesive layers on substrates which are to be bonded together. The process according to the invention is therefore suitable for the formation of coatings on substrates of the type exemplified, for the dressing of leather, for the production of glass fiber sizings and for the production of composite or bonded materials by bonding various substrates such as cork or wood powder, wood chips, glass fibers, asbestos, paper-like materials, plastics, rubber waste or ceramic materials, either alone or as mixtures.

The invention is further illustrated, but is not intended to be limited by the following examples in which all parts and percentages are by weight unless otherwise specified.

EXAMPLE 1

350 g of a biuret polyisocyanate based on 1,6-diisocyanatohexane having an isocyanate content of 23.9% were added to 164 g of a polyester having a molecular weight of 1700 based on adipic acid, hexane-1,6-diol and neopentyl glycol (ratio by weight of diols=11:6), and the reaction mixture was heated to 120° C. for 3 hours (isocyanate content of prepolymer =13.5%).

250 g of the reaction product (0.8 mol NCO) were added at 0 to 10° C. to a mixture of 33.8 g (0.8 mol) of cyanamide (containing 1% NaH2PO4) and 81.2 g (0.8 mol) of triethylamine in 50 ml of tetrahydrofuran at such a rate that the temperature did not exceed 25° C.

After the components had been added, the reaction mixture was stirred for 15 minutes and the polyisocyanate addition product was then dissolved in 350 ml of water. Nitrogen was then passed through the solution at 60° to 80° C. to remove the tetrahydrofuran. The resulting aqueous solution had a solids content of 44% and a viscosity at 20° C. of 1760 mPas.

The dissolved polyisocyanate addition product contained 220 milliequivalents of anionic groups per 100 g.

50 g of a polyepoxide based on bisphenol A and epichlorohydrin (epoxide equivalent weight 180) were then added and the mixture was homogenized by stirring for 10 minutes at 50° C.

The solution of the polyisocyanate-epoxide addition product was coated onto a glass plate. After 3 days' storage at room temperature, a film which was resistant to both water and acetone was obtained.

EXAMPLE 2

21 g (0.5 mol) of cyanamide (stabilized with 1% NaH2PO4), 50.5 g (0.5 mol) of triethylamine and 180 g of a polyepoxide based on bisphenol A and epichlorohydrin (epoxide equivalent 180) dissolved in 50 ml of tetrahydrofuran were mixed and cooled to 10° C. 155 g (0.5 mol NCO) of the prepolymer from Example 1 dissolved in 100 ml of tetrahydrofuran were added dropwise at 10° to 20° C. After further stirring for 15 minutes, 230 ml of water were added.

A clear solution having a solids content of 48% and a viscosity at 22° C. of 170 mPas was obtained.

The solution was coated onto a glass plate. After 3 days at room temperature, a glossy film which was resistant to both water and acetone was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a water-resistant and solvent-resistant coating which comprises coating a substrate with an aqueous coating composition containing as binder a mixture of
    (1) a reaction product of an organic polyisocyanate with a salt of cyanamide and a base comprising a member selected from the group consisting of ammonia, volatile primary and secondary amines having a pKb-value of at least 3.1 and volatile aliphatic tertiary amines, wherein said reaction products contain anionic structural units of the formula

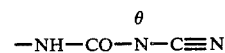

in a quantity of about 5 to 1200 milliequivalents per 100 grams of reaction product and
    (2) a polyepoxide having at least 2 epoxide groups per molecule in an epoxide equivalent weight of at least about 80, said polyepoxide being present in a quantity corresponding to an equivalent ratio of epoxide groups to said anionic structural units of about 0.1:1 to 3:1, and
cross-linking the binder of the coating composition at a temperature of about 5°–200° C.

2. An aqueous coating composition containing as binder a mixture of
    (1) a reaction product of an organic polyisocyanate with a salt of cyanamide and a base comprising a member selected from the group consisting of ammonia, volatile primary and secondary amines having a pKb-value of at least 3.1 and volatile aliphatic tertiary amines, wherein said reaction products contain anionic structural units of the formula

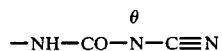

in a quantity of about 5 to 1200 milliequivalents per 100 grams of reaction product and (2) a polyepoxide having at least 2 epoxide groups per molecule in an epoxide equivalent weight of at least about 80, said polyepoxide being present in a quantity corresponding to an equivalent ratio of epoxide groups to said anionic structural units of about 0.1:1 to 3:1.

* * * * *